United States Patent [19]

Wells et al.

[11] 3,767,898

[45] Oct. 23, 1973

[54] CONTAINER WITH A COMBINED ELECTRIC HEATER AND THERMOSTAT UNIT

[76] Inventors: Robert M. Wells, 4271 Ira Rd., Akron, Ohio 44313; Alton R. Wells, 4573 W. Trade Winds Ave., Lauderdale-by-the-Sea, Fla. 33308

[22] Filed: Dec. 29, 1972

[21] Appl. No.: 319,292

[52] U.S. Cl. .................. 219/441, 219/523, 219/536, 219/544
[51] Int. Cl. .......................................... F27d 11/02
[58] Field of Search ............... 219/436, 437, 441, 219/510, 523, 530, 536, 538, 544; 337/380, 112

[56] References Cited
UNITED STATES PATENTS

| | | | |
|---|---|---|---|
| 2,719,212 | 9/1955 | Kircher | 219/536 |
| 2,789,201 | 4/1957 | Sherwin | 219/523 |
| 2,864,929 | 12/1958 | Schwing | 219/523 |
| 2,907,860 | 10/1959 | Geller | 219/523 X |
| 3,137,786 | 6/1964 | Wells et al. | 219/441 |
| 3,138,698 | 6/1964 | Wells et al. | 219/441 |
| 3,184,163 | 6/1965 | Wells et al. | 219/441 |
| 3,277,277 | 10/1966 | Wells | 219/441 |
| 3,303,327 | 2/1967 | Himelsbaugh | 219/544 |
| 3,439,150 | 4/1969 | Wells et al. | 219/523 |

*Primary Examiner*—Volodymyr Mayewsky
*Attorney*—Vern L. Oldham et al.

[57] ABSTRACT

A container having an opening in the bottom thereof and a combined electric heater and thermostat unit secured to and extending through the opening of said bottom. The combined electric heater and thermostat unit including a metal case with an electric heater coil positioned on a tubular insulating core within the case, such insulating core having a pair of opposed slots formed in an end thereof adjacent the initially open end of the case, and a thermostat positioned within the case and received in the slots to extend across the bore of the insulation core and be directly connected to a terminal of the heater coil. The end of the case can be closed to mount the unit in any of several manners.

9 Claims, 4 Drawing Figures

PATENTED OCT 23 1973 3,767,898

CONTAINER WITH A COMBINED ELECTRIC HEATER AND THERMOSTAT UNIT

The present invention relates to electrical heaters, and particularly to an improved, compact immersion heater having a thermostat positioned within the heater in special relationship thereto.

BACKGROUND OF THE INVENTION

This invention relates to the type of heaters shown in U.S. Pat. No. 2,719,212. Such types of electrical immersion heaters have had appreciable commerical use in the control of the temperature of a variety of electrical appliances, and particularly liquid heating applicances such as coffee percolators, cocoa or chocolate makers, milk warmers, etc. These heaters may be used in other appliances for controlled heating action, as desired.

Heretofore some efforts have been made to provide units formed from thermostats directly associated with an electrical immersion heater or equivalent unit. Such prior structures are represented by U.S. Pats. Nos. 3,277,277 and 3,439,150. In articles of this type, the size of the heater and thermostat unit is very important since there are space or size limitations involved in many uses of such articles. Furthermore, the temperature at which the thermostat acts or functions for power control is important and the rapidity with which the temperature is sensed by the thermostat is also an important characteristic in the construction, use and design of any control circuit involving a heater and a thermostat control therefor.

The units provided heretofore have been, in some instances, adapted to sense or be actuated at relatively high temperatures, such as the structure shown in U.S. Pat. No. 3,439,150, or these controls may require the presence of one or more special members in the electrical heater and this is represented by the U.S. Pat. No. 3,277,277 and the structures shown therein.

The art is always seeking a more compact thermostat and heater article which will function effectively and rapidly for power supply and control to immersion heaters or other heaters under temperature controlled conditions.

The general object of the present invention is to provide a novel and improved heater which is characterized by the axial compactness of the heater and by a special positioning of a thermostat within the heater container.

Another object of the invention is to provide an electric heater of the immersion can or container type with a thermostat positioned adjacent the initially open end of the container but being held positively in place by engagement with an insulation core by which the heater coil is positioned.

Another object of the invention is to provide a combined heater and thermostat unit having a thermostat positioned in the heater adjacent the bottom thereof to sense water temperature rapidly of a volume of water in which the heater is immersed and wherein the heater coil can extend axially of such container a controlled distance.

A further object of the invention is to secure an electric heater to a container by a portion of the heater can and to enclose the heater end by a container base support.

Another object of the invention is to reduce the number of parts in an electric immersion heater and thermostat combination.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

INVENTIVE SUBJECT MATTER

Figure 1:
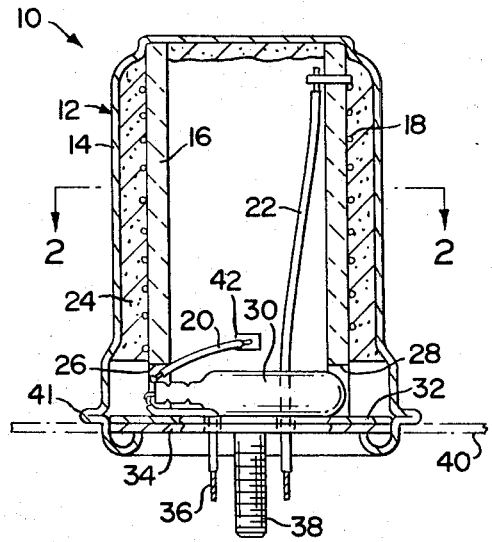
FIG. 1 is a vertical section of a heater and thermostat unit embodying the principles of the invention.

The present invention, as one embodiment thereof, relates to an immersion electric heater and thermostat unit wherein the electric heater includes a metal case, a tubular insulating core in the case and extending axially thereof, an electric heater coil on the core, the core having a pair of opposed slots or recesses formed therein in the end of the core initially adjacent the open end of the case, a thermostat positioned within the case and extending transversely thereof, being received in and positioned by the slots in the core to extend across the bore thereof, means to close the end of the case, and means connecting the thermostat directly to a terminal of the heater coil for control of power supply thereto.

Reference now is made to the details of the construction shown in the drawings, and an electric heater and thermostat unit 10 is shown which includes an electrical heater 12 of substantially conventional design and construction. This heater 12 includes a cylindrical case 14 in which a tubular insulating core 16 is received. The core 16 has an electrical heater coil 18 would thereon and leads 20 and 22 connect to opposite ends of the heater coil 18 for power supply thereto, or the lead 20 may be the end of the heater coil wire.

In the heater 12, the heater coil 18 is held in place as by a body or mass of insulation material 24 which is provided within the case 14 and this insulation mass or body is provided, for example, in accordance with the teachings of U.S. Pat. No. 3,050,833. Thus, the individual convolutions of the coil 18 are held in place and the core 16 is substantially centered in and insulated from the case 14.

As an important feature of the invention, the insulation core 16 has a pair of, normally, diametrically opposed slots 26 and 28 formed in an end of this core 16 that is initially adjacent the initially open end of the heater case 14. In forming the insulation mass or body 24, the material used is present in the case 14, when the case is inverted, up to a point immediately adjacent and slightly below the ends of the slots 26 and 28 to provide a mass that does not interfere with a thermostat 30. The thermostat opposite ends are positioned in the slots 26 and 28 so that it extends across the center bore of the insulation core 16. The thermostat preferably extends the length of the diameter of the core 16 and it has a metal case to aid in its heat sensing action.

The unit 10 usually is completed as by the use of a mica or other insulation disc 32 that abuts against the end of the insulation core 16 and is secured in position by a metal end plate 34. Or, the disc 32 can be omitted, if desired, especially when a dead case thermostat is used. This end plate 34 is held in place by spinning or otherwise turning over the initially open end of the case 14 to exert an axially inwardly directed force on the end plate 34. It is a feature of the invention that the end plate 34 abuts against the insulation disc 32 (when used) which in turn abuts on the end of the insulation core. Hence, the thermostat is retained in position at the lower end of the case 14.

The thermostat 30 is connected in the power supply for the heater coil 18, so that it can act as a switch in such circuit. A lead 36, together with the lead 22, extends through suitable holes in the end plate 34 for connection to a power source. A positioning stud 38 usually is operatively associated with, secured to, or threadably engaged with the end plate and is normally used for positioning the unit 10 operatively. For example, if the unit is to be used within a container indicated by the bottom wall 40, the heater case 14 will extend upwardly thereof in the manner indicated, and a positioning flange 41 adjacent the lower end of the case aids in securing the unit 10 in position.

At this time, the thermostat 30, being immediately adjacent the lower end of the operative portion of the heater 12 is not only adapted to sense some of the operating temperatures of such heater coil, but it is also adapted to sense the temperature of the water in the lower portion of the container 40. The thermostat is positioned at and/or immediately above the flange 41 and hence vertically close to the wall 40 to sense the temperature of water thereadjacent. This water, in a coffee percolator for instance, may be at about 180° to 200° F. and the thermostat, for example, in a 200 watt heater unit, can be adapted to sense about a 200° F. temperature to open the power supply circuit when such temperature condition is reached. By this positioning of the thermostat, a prompt control action is obtaind at all times including when a dangerously low level of water is reached in the container 40. The thermostat will quickly sense any rapid rise in temperature or any temperature beyond that safe for use of the container 40, and terminate power supply to the heater. Hence, under relatively repeated abuse conditions, as when the container 40 has boiled dry, or substantially so, a quick response is obtained by the thermostat and any damage to the container 40 or unit 10 is avoided.

In some instances, it may be desirable to place the heater coil 18 only on the middle and upper portions of the core 16 and this again avoids any excessive heat flow to the thermostat 30 and aids in maintaining low operating or control temperatures therefor even though the heater 12 might be of higher wattage, such as a 600 watt heater. Yet the operating temperature for the thermostat may be appreciably below the 650° to 750° F. temperatures obtained, for example, within the insulation core 16 at the upper portion thereof. The unit 10 normally is vertically positioned as indicated in the drawings.

By this positioning of the thermostat, it is retained against movement in the unit or assembly 10, and the manufacturer of the electric heater and thermostat unit 10 can completely control the manufacturing conditions for this unit including all electrical connections therein. The thermostat is, for example, of the type of construction shown in U.S. Pat. No. 2,925,599 or of some similar construction.

Any conventional terminals 42 can be used for connecting the leads 20 and 36 operatively to the heater coil and provide the controlled power supply thereto.

The metal plate 34 shown in FIG. 1, may, if desired, have a thin ceramic or other insulating washer secured thereto or associated therewith, as desired. But, as previously indicated, the thermostat 30 may directly be supported on the end plate 34, when desired.

Figure 3:
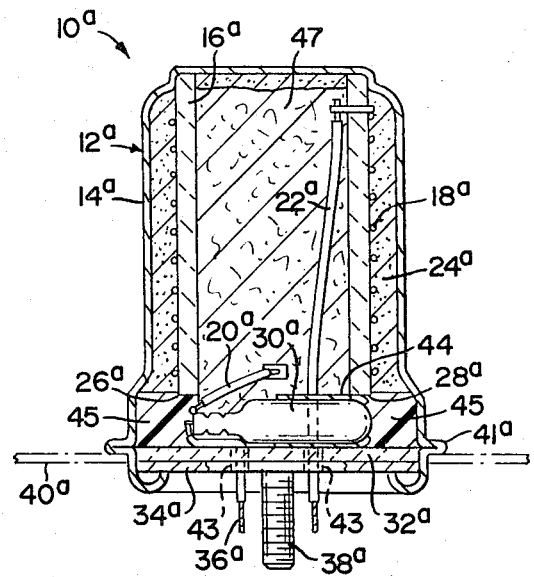
FIG. 3 is a vertical cross section of another unit of the invention.
Figure 2:
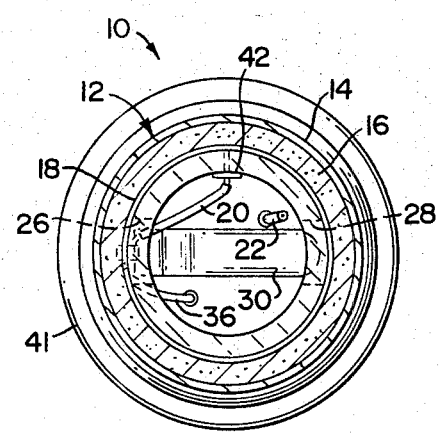
FIG. 2 is a cross section taken on line 2—2 of FIG. 1.

In FIG. 3, a slightly modified type of a construction is shown wherein a thermostat and heater unit 10a is shown. This unit 10a has an end plate 34a thereon and it also has a substantially conventional ceramic disc or washer 32a positioned on the inside face of the end plate 34. The ceramic disc and end plate both have suitable apertures 43 provided therein through which the two power supply leads connecting to the unit will extend. This unit 10a can be mounted on an appliance or other article in any conventional manner usually by use of a positioning stud 38a provided on the end plate. A thermostat 30a is engaged by a core 16a as before.

The ceramic washer 32a can be omitted in FG. 3 to provide an adequate air gap to separate the metal plate 34a and the thermostat. Asbestos insulation fibers 47 can be placed inside the core 16a as shown.

Figure 4:
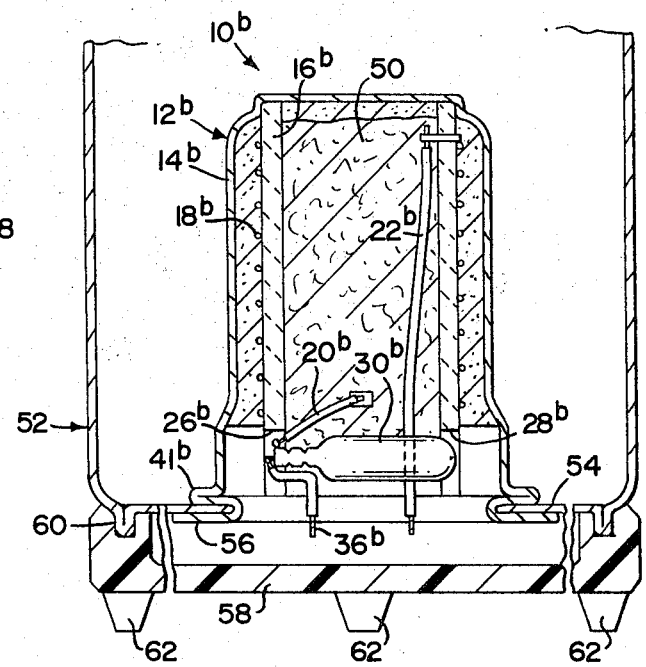
FIG. 4 is a fragmentary vertical section of another heater and thermostat unit of the invention in combination with a container.

Yet a further modified thermostat and heater unit of the invention is indicated at 10b in FIG. 4. In this instance, the heater 12b includes an enclosure or can 14b which has a positioning flange 41b adjacent its initially open end. Again, a suitable core 16b is provided for carrying the heater coil thereon. This heater core 16b is suitably embedded in and secured to the heater container as previously described. However, in addition, it is preferred to fill the bore of this core 16b with an insulation material, such as asbestos 50. These particles or shreds of asbestos can be poured into the heater assembly when it is inverted and just be tamped down lightly in place to compress the asbestos slightly and aid it in staying in a given position. Again, a thermostat 30b is positioned in slots or recesses 26b and 28b provided in the core 16 adjacent the open end of the heater. In this instance, the unit of the invention is particularly adapted for use with a suitable container indicated at 52 in the drawings. The container includes a bottom wall 54 with a central aperture therein sized to receive the heater can end therein. Thus, the thermostat and heater unit 10b of the invention is made to the form shown in the drawings and assembly of the unit to the container 52 is provided by flaring the exposed end 56 of the heater 10 outwardly back upon the adjacnet margins of the bottom wall 54 of the container. If desired, this end wall can be worked both axially inwardly and then radially outwardly when engaging with the bottom wall 54 to engage the core 16b and retain the heater means in position. Then the lower end of the container is sealed, as well as the initially open end of the unit 10b, by securing a suitable base 58 to the container 52. This support base 58 can be plastic or be of other suitable construction and have a sealed engagement with, for example, a rib 60 provided on the lower marginal portion of the container. Any suitable adhesive, such as an epoxy cement can be used to secure the base 58 to the rib 60 provided on the container whereby a waterproof enclosure and seal means is provided for the units and heater means of the invention. Power supply leads for the heater coil 19 can extend through any suitable sealed apertures provided in the base 58. Support knobs or buttons 62 are also provided on this support base.

The various heater and thermostat units of the invention can be made of a very short axial length when desired, but yet to provide high wattage capacity for the size of the unit. That is, the entire unit can be made of a size, for example, 1 3/4 inch high and 1 inch in diameter, but yet to have a 600 watt capacity at 120 volts A. C. No extra mounting space is required for the thermostat, of course, and the units of the invention are adapted to sense, accurately and rapidly, the temperature of the surrounding water in the container with which the heater unit is used.

By having the thermostat case terminal connecting directly to a heater winding terminal on the heater core, a savings in an assembly lead, connector and/or other means is made possible by the present invention.

An insulating air gap is provided in some instances by the positioning of the thermostat 30 or equivalent means in spaced relationship to any metal end plate 34 or the like. That is, the insulating means or packing means such as asbestos insulation that can be placed inside the bore of the core of the heater coil will retain the thermostat against vertical movement, especially when the thermostat is connected directly to a terminal of the heater wire.

The construction shown in FIG. 4 is especially desirable as this avoids the use of an end plate as well as any ceramic or insulating disc on the end of the heater container. Furthermore, the positioning stud and the height required therefor are eliminated in the construction of FIG. 4 whereby a compact unit with fewer elements in it than prior constructions in the art is obtained.

Use of the asbestos insulating means positioned in the core of the heater coil or carrier member aids in insulating the control thermostat from the high heat conditions established by the heater coil so that an effective "temperature control" action can be obtained and lower operating temperatures be provided for the thermostat even when primarily sensing the heat from the heater resistance windings as the best source of heat supply to the thermostat.

By use of the construction shown in FIG. 4, the unit of the invention can be positioned in a very small diameter vessel which also may have a very low profile or height particularly in the base provided therefor.

Thermostats, as provided by the invention can be used as control devices to regulate heat flow to the associated container and fluids therein, or else the thermostat can be used as a safety device for shutting off and preventing any excessive heating of the container and any contents thereof. A minimum space separation is provided between the thermostat and the contents of the container to reflect promptly and accurately temperatures in the container and prevent excessive heating thereof. This aids in providing maximum economy of manufacturing costs because of the reduction of parts in the heater and thermostat units of the invention.

In the unit shown in FIG. 3, slots 26a and 28a are formed in the core 16a at its open end to receive the thermostat 30a which is snuggly held in the slot 28a by friction. An insulation sleeve 44 covers the thermostat case at one end and aids in fixing the thermostat in postiion. Insulation means 45 is placed between the ends of the thermostat and the metal case 12a to avoid any possible contact therebetween.

Such insulation means 45 may comprise any suitable substance, and a mass of silicone rubber composition is shown in the drawings since such material can be placed into the heater assembly when the mass is flexible and it will set up or cure in place to remain permanently in position in the manner shown. However, other insulation means, such as ceramic discs or sheets or mica sheets and insulation means could be used at the ends of the thermostat. This permits the thermostate to be of a so-called "live" case construction but to be well protected against contact with the case 12a.

For volume production of units of the invention, it is especially important that the thermostats be wedged or be otherwise frictionally engaged at at least one end thereof into one of the slots provided in the insulation core carrying the heater wire in the heater unit. Thus, use of an insulation sleeve around the thermostat case at one end thereof is desirable inasmuch as such insulation sleeve, which can be made from fiberglass or other equivalent material, including cardboard, provides some flexibility to the thermostat and provides an effective tight wedged positioning of the thermostat. Hence, it will not move in any direction when applying an end plate or support means to the open end of the heater can and the thermostat likewise will not be dislodged in any manner by the other normal assembly operations required to complete the unit of the invention.

Use of the insulation means within the insulation core on which the heater coil is positioned, as the fibers 47 in FIG. 3, prevents radiation of heat from the insulation core to the thermostat to effect control action thereon and permits lower temperature calibration or rating for the thermostat for operation.

Obviously, the further that the thermostat can be spaced axially in the heater from the actual heater coil, reduces the operative temperature conditions and reduces the temperature for sensing action of the thermostat for control action.

The thermostat 30a in FIG. 3 or the similar members in the other units of the invention can be moved axially slightly to the right from the positions shown so that the thermostats can be frictionally wedged in the end slots in the cores 16a or similar members. Hence accurate positioning of the thermostats is obtained and they are fixedly spaced from the metal end plates by a protective air gap as when the disc 32a is omitted. The sleeve 44 also can be omitted and the thermostat 30, 30a or 30b will just be seated at one end at least in a slot in the insulation core. The insulation mass 24b holds the insulation or carrier core 16b in position in FIG. 4.

The terminal and connection means extending from the initially open end of the thermostat may aid in positioning it in the slots in the end of the insulation core. This result is especially obtained by use of insulation masses as in the unit of FIG. 3.

All of the heater coils used may be spaced from the thermostats by providing the heater coils only on the cores at their mid portions and upper ends.

Insulation masses like those at 45 in FIG. 3 can obviously be used in the construction of FIG. 4 to position the thermostat 30b in the slots of the core or to aid in positioning the thermostat.

Only two leads extend from the units of the invention and compact, easily assembled but sturdy, maintenance free assemblies have been provided so that the objects of the invention are thought to be achieved.

While in accordance with the Patent Statutes at least one best known embodiment of the invention has been illustrated and described in detail, it is to be understood that the invention is not limited thereto or thereby, but that the inventive scope is defined in the appended claims.

What is claimed is:

1. A combined electric heater and thermostat unit comprising a metal case, a tubular insulating core in said case and extending axially thereof, an electric heater coil mounted on said core, said metal case having an initially open end, said core having a pair of opposed slots formed in the end thereof adjacent said case open end, a thermostat including a heat conducting casing positioned in said case with opposite end portions received in said slots to position the thermostat to extend across the bore of said core, closure means closing the end of said case, electrical connector means connecting said thermostat to said heater coil, and electrical leads extending through said closure means.

2. A combined electric heater and thermostat unit as in claim 1 where said means closing the end of said case abut on the end of said core and retain said thermostat in engagement with said core.

3. A combined electric heater and thermostat unit as in claim 1 where said metal case has a positioning flange thereon defining a plane adjacent its initially open end, and said thermostat is above but adjacent the plane defined by said flange to sense the temperature of any water in a container in which said unit is positioned, said unit being adapted to be operatively engaged with a wall of any such container.

4. A combined electric heater and thermostat as in claim 1 where insulation means is positioned intermediate the ends of said thermostat and said metal case.

5. A combined electric heater and thermostat unit as in claim 4 where said insulation means comprises a mass of resilient elastomer engaging said thermostat and said core.

6. A unit as in claim 1 where said thermostat has a portion thereof operatively frictionally engaging the side walls of one of said slots to secure said thermostat in position.

7. A unit as in claim 6 including an air gap extending transversely of the heater intermediate said thermostat and an end plate comprising the means for closing the end of the case.

8. In combination, a container having an opening in the bottom thereof and a combined electric heater and thermostat unit comprising a metal case, a tubular insulating core in said case and extending axially thereof, an electric heater coil mounted on said core, said metal case having an initially open end with a positioning flange thereadjacent, said core having a pair of opposed slots formed in the end thereof adjacent said case open end, a thermostat including a metal casing positioned in said case and received in said slots to extend across the bore of said core electrical connector, means connecting said thermostat to said heater coil, said positioning flange engaging said container bottom, end portions of said metal case extending radially outwardly to engage said container bottom; an insulating base and closure means secured to said container; and electric leads extending through said base and closure means, said thermostat having a portion thereof frictionally engaging the side walls of one of said slots to secure said thermostat in position.

9. In a combination as in claim 8 and comprising masses of insulation means engaging end portions of said thermostat to position it.

* * * * *